United States Patent [19]

Lohoff

[11] 4,055,200
[45] Oct. 25, 1977

[54] MOISTURE DETECTION APPARATUS

[76] Inventor: Warren G. Lohoff, 1947 Havenwood Drive, Los Angeles, Calif. 91360

[21] Appl. No.: 632,451

[22] Filed: Nov. 17, 1975

[51] Int. Cl.² .................................. A01G 25/00
[52] U.S. Cl. ........................... 137/624.11; 239/63; 92/50
[58] Field of Search ................. 137/78, 624.11, 624.13, 137/624.12, 199; 239/63, 64; 92/38, 50

[56] References Cited

U.S. PATENT DOCUMENTS

| | | | |
|---|---|---|---|
| 2,863,698 | 12/1958 | Richards | 239/63 X |
| 3,113,724 | 12/1963 | DeBough | 239/63 |

*Primary Examiner*—Alan Cohan
*Attorney, Agent, or Firm*—Roger A. Marrs

[57] ABSTRACT

A soil moisture detector is disclosed herein for incorporation between a timer controller and an electrical water supply valve. The detector includes a pneumatic diaphragm apparatus whereby a pressure level is maintained or released between a pair of diaphragms in response to a moisture sensing valve buried in the ground. The pneumatic condition of the detector permits the slug of a solenoid valve, responsive to the timing sequence of the timer controller, to open or close a switch for supplying voltage to the water supply valve.

13 Claims, 8 Drawing Figures

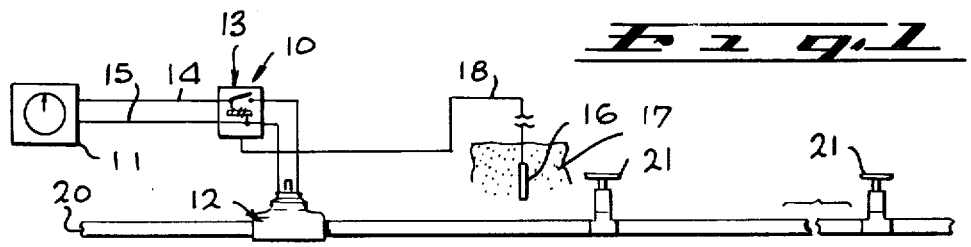
Fig. 1
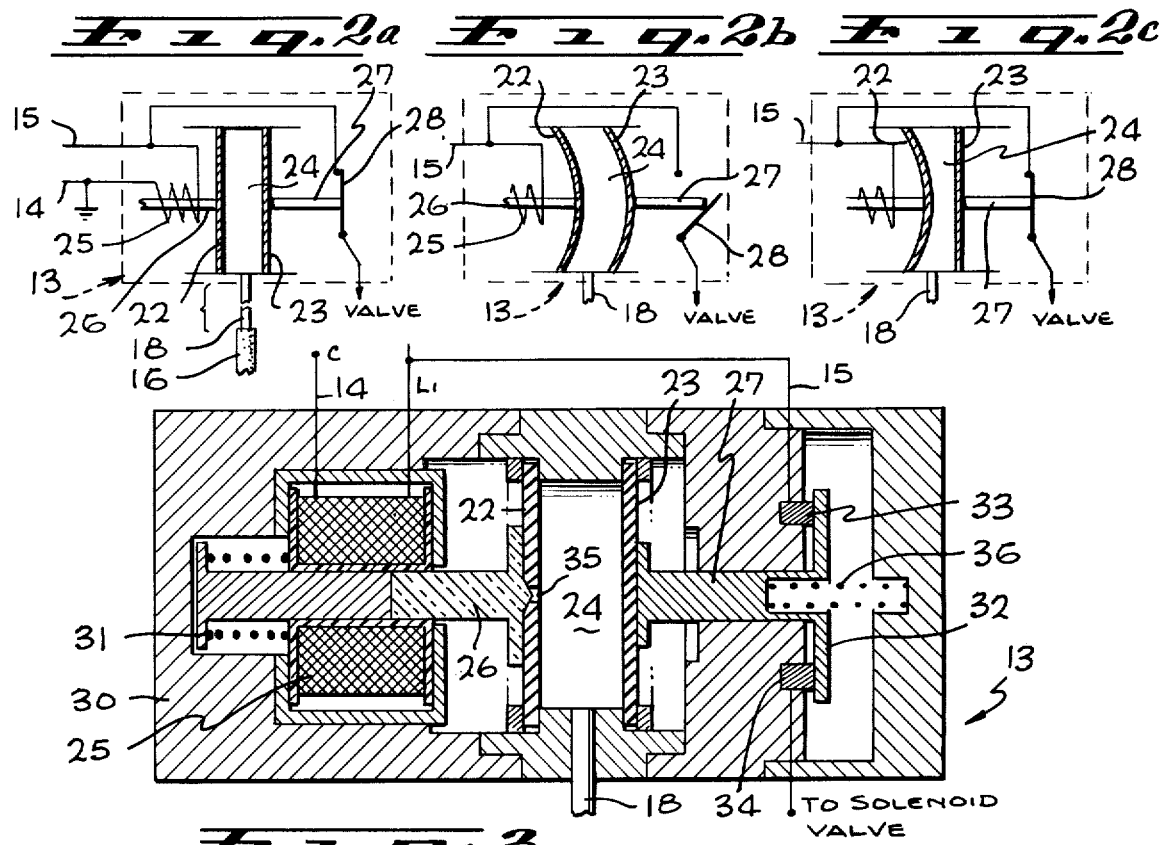
Fig. 2a  Fig. 2b  Fig. 2c
Fig. 3
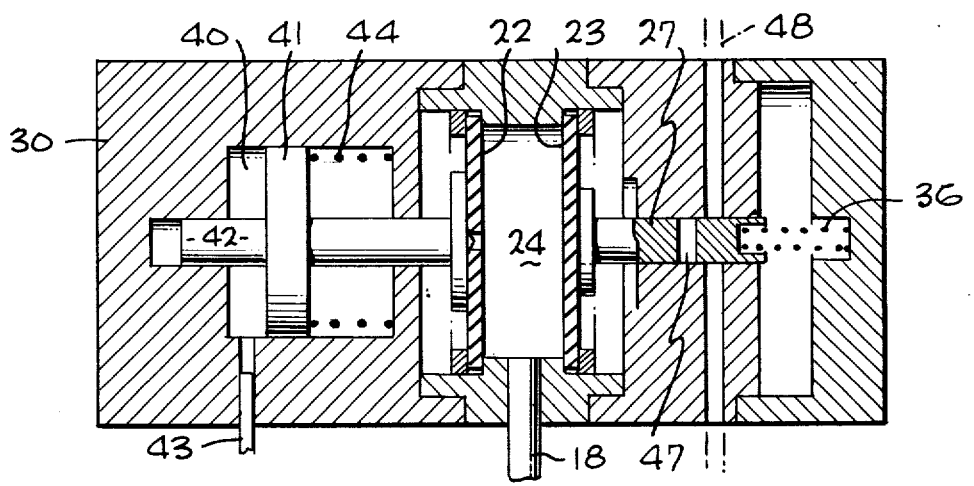
Fig. 4

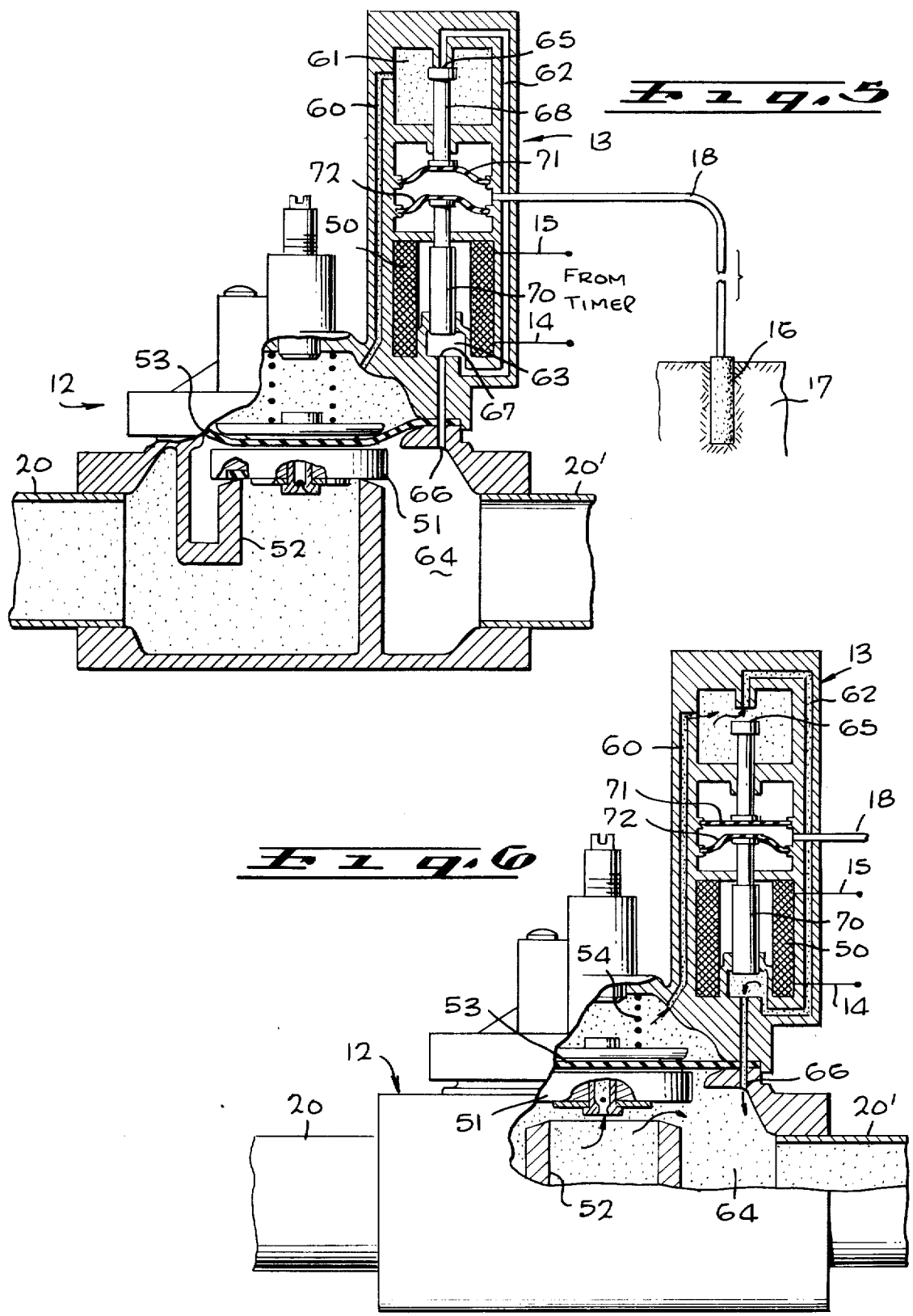

MOISTURE DETECTION APPARATUS

BACKGROUND OF THE INVENTION

1. Field of the Invention

This invention relates to soil moisture sensing devices and more particularly to a novel automatic sensing device for providing water to the soil when needed for continued life and growth of plants, flowers or the like in response to the moisture content of the planting medium.

2. Brief Description of the Prior Art

In the past, it has been a well known practice to provide automatic watering devices, such as sprinklers, in order to supply plants with a proper amount of moisture so that the plants or natural growth will flourish. By providing a plant with too little or too much water, its growth progresses or life span will be impeded. Since the proper amount of moisture varies not only among different types of growth, but with the particular environment in which the plant is growing, it is a time consuming process to manually supply the necessary water. Automatic devices for providing the necessary water to the plant life are highly desirable and time saving devices.

However, the variability and unpredictability of the amount of water needed by a specific plant is difficult to forecast. Water should be supplied to the plant in response to the plant's need for the water and not, as is characteristic of prior art devices and practices, in response to an arbitrary standard such as time. Time responsive watering devices have been generally found unsatisfactory since a plant's need for water is not solely a function of time, but varies with conditions of the planting medium, the atmospheric temperature, humidity, etcetera.

For example, a conventional system employs a timer controller which operates a solenoid valve incorporated into a water supply system so that when the time as arbitrarily set by the user arrives, power is supplied via the solenoid to the water supply valve so that water is then supplied to a system of sprinklers or other irrigation devices. However, water may be supplied even though the ground or plant medium is saturated such as subsequent to a heavy rain or the like.

Therefore, a long standing need is present to incorporate into automatic water sprinkling systems, a detection device or apparatus which functions in conjunction with the timer to operate the water supply valve in response to the moisture content of the soil or plant medium.

SUMMARY OF THE INVENTION

Accordingly, the problems and difficulties encountered with prior watering and automatic moisture supplying devices are obviated by the present invention which provides a pneumatic diaphragm valve means operably connected between a conventional timer controller and a conventional water supply valve whereby the voltage necessary for operating the water supply valve is introduced thereto or held therefrom depending upon a moisture sensing means embedded in the soil and operably connected to the pneumatic diaphragm valve means.

In one form of the invention, the pneumatic diaphragm valve means includes a solenoid operated slug which is connected to a first diaphragm of the pair and is operable to flex into and out of an air chamber separating the diaphragm. The moisture sensing element is coupled to the air chamber so as to release or hold air within the chamber dependent on the moisture condition of the ground. The second diaphragm of the pair is responsive to movement of the first diaphragm only in the presence of a pneumatic level or pressure level in the air chamber. In the absence of such an air pressure or level, the second diaphragm is not responsive to movement of the first diaphragm. The second diaphragm is operably coupled to a switch for opening and closing a power circuit to the electrical water supply valve accordingly.

The soil moisture sensing means takes the form of an air valve embedded in the soil which is of a porous nature so that it responds to moisture condition depending upon the sensibility to conduct or not conduct air therethrough.

Therefore, it is among the primary objects of the present invention to provide a novel soil moisture detector cooperating with a timer and a water supply valve so that the water supply valve is opened in response to actuation by the timer and actual soil moisture conditions.

Another object of the present invention is to provide a novel means for opening a water supply valve depending on actual soil conditions within a predetermined time sequence as set by a conventional timer.

A further object of the present invention is to provide a novel moisture detection device operatively coupled to a timer and a water supply valve for opening the valve in response to a predetermined time sequence and predetermined soil moisture conditions.

Still a further object of the present invention is to provide a novel soil moisture detector for operating a pneumatic or hydraulic means for supplying and operating voltage or hydraulic pressure to valves for opening and closing a water supply mechanism.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a schematic drawing of a typical installation employing the novel soil moisture detecting apparatus of the present invention and illustrated as being installed between a conventional timer and a conventional water supply valve;

FIGS. 2a, 2b and 2c are simplified embodiments of a novel pneumatic diaphragm valve employed in the present invention;

FIG. 3 is another embodiment of the present invention showing the novel valve as used between the controller and the water supply mechanism;

FIG. 4 is a view similar to the longitudinal cross sectional view of FIG. 3 showing the valve in another mode of operation;

FIGS. 5 and 6 show still another embodiment of the present invention employing an automatic diaphragm valve having solenoid operated controls responsive to the air valve sensing means.

DESCRIPTION OF THE PREFERRED EMBODIMENT

Referring to FIG. 1, the novel soil moisture apparatus of the present invention is indicated in the general direction of arrow 10 and is illustrated as being installed between a conventional timer controller 11 and a water supply valve 12. In one form of the invention, the apparatus is housed in a soil moisture switch assembly identified by numeral 13 which is directly connected to the controller 11 via lines 14 and 15. The assembly is also connected to a porous, ceramic sensor element 16 which is of conventional construction and which is buried in the ground 17. An exhaust tube 18 interconnects the sensor 16 with the switch assembly 13.

The porous sensing element 16 is connected to an air chamber within the assembly 13 for controllably expelling air from the chamber whenever the condition of the soil reflects a need for more moisture. As an example, the sensing element 16 may be formed of a porous, ceramic material, may have a generally cylindrical configuration on the order of ⅜ inch in diameter and 2 inches in length. If desired, although not a requirement, the free end of the sensing element is pointed or beveled so that the sensing element may be readily inserted into and completely buried by the planting soil or ground 17. The material of the sensing element 16 is preferably a ceramic material having an average pore size on the order of about 5 to about 12 microns. The arrangement is such that when the porous ceramic sensing element is in a relatively dry condition, it will permit the controlled seepage of air from the air chamber within the assembly 13 to be exhausted under pressure. However, when the sensing element is contacted by substantial moisture, the moisture drawn into the sensing element by capillary action functions, at least within the parameters of the present invention, to close off the pores of the element to prevent further flow of air and thereby prevent the further seepage of air into the surrounding dry ambient environment.

It is further noted in FIG. 1 that the water supply valve 12 is operably connected to a water supply line 20 which conducts a flow of pressurized water therethrough so that an adequate supply is provided to a plurality of sprinkler heads, such as sprinkler 21, so that the water may be distributed to the surrounding area.

Referring now to FIG. 2a, it can be seen that the soil moisture switch assembly 13 includes a pair of diaphragms 22 and 23 which are operably mounted in a housing in spaced-apart relationship so as to define an air chamber 24 therebetween. Diaphragm 22 includes a solenoid having a coil 25 wrapped about a slug 26 which is connected at one end to the diaphragm 22. Therefore, when the coil is energized the slug will move in a reciprocal manner to flex the diaphragm 22 towards the diaphragm 23. The coil is de-energized, the slug and diaphragm 22 will return to its original position. However, it is noted that the exhaust tube 18 is connected directly into the air chamber 24 at one end and directly to the sensing element 16 at the other end. Therefore, when the diaphragm 22 is forced toward diaphragm 23 and moisture has closed the pores of sensor 16, air within the chamber 24 cannot be expelled and diaphragms 22 and 23 move as a unit in the same direction such as is shown in FIG. 2b.

In FIG. 2b, it is noted that a pin or plunger 27 is carried on the diaphragm 23 so as to move therewith. The end of plunger 27 is directed to engage with a movable contact 28 associated with a switch connected between power line 15 coupled to the controller 11 and the electrical water supply valve 12. Therefore, when the soil is in a wet condition, the switch 28 is open and no power is supplied to the valve 12 even though the timer controller 11 is in its on condition.

Referring now to FIG. 2c, it can be seen that when the sensing element 16 is dry and the slug and diaphragm 22 are moved toward the diaphragm 23, air is expelled from the chamber 24. It is now to be noted that the diaphragm 23 will not move since the air couplings between the pair of diaphragms has been broken. Therefore, the plunger 27 does not disturb the normally closed condition of switch 28. Power from the timer controller 11 is supplied directly to operate the water supply valve 12.

Referring now in detail to FIG. 3, another embodiment of the present invention is illustrated wherein the switch assembly 13 is included in a housing 30. However, the same components are present and are illustrated by the numerals previously used to describe the various components. For example, coil 25 is operably connected via lines 14 and 15 to the timer controller 11 and energization of coil 25 moves the slug 26 away from the core against the tension of a bias spring 31. Movement of the plunger urges the diaphragm 22 toward diaphragm 23. If the sensing element is wet, air within the chamber transmits the movement of diaphragm 22 to the diaphragm 23 which moves the plunger 27 outward. In this embodiment, the plunger 27 includes a contact member 32 which normally engages between the contact terminals 33 and 34 respectively. When the contact plate 32 has moved away from its coupling between contact terminals 33 and 34, a similar situation is achieved to that shown in FIG. 2b and power to the electric solenoid valve 12 is discontinued or interrupted. Upon the de-energization of coil 25, spring 31 returns the slug 26 to its original position and a small aperture 35 in the diaphragm 22 permits the diaphragm to return without creating a suction or vacuum within the chamber 24. This movement will also cause diaphragm 23 to return via a return spring 36 so that the contact plate 32 will again be normally closed against the contact terminals 33 and 34. In a similar situation shown in FIG. 2c, when a wet condition exists on the sensor 16, the diaphragm 22 will move toward the diaphragm 23 but the diaphragm 23 wil not move at all and electrical power will be supplied to solenoid valve 12 via line 15 in contacts 33 and 34 as intercommunicated by contact plate 32.

Referring now in detail to FIG. 4, another embodiment of the present invention is shown which is similar to that embodiment of FIG. 3 with the exception that a hydraulic cylinder is substituted for the electromagnet coil and slug. For example, the housing 30 is provided with a chamber 40 constituting a cylinder movably housing a piston 41 carrying a centering rod 42. One side of the piston may be pressurized via a tube 43 communicating therewith while the other side of the piston 41 includes a return via spring 44. Diaphragm 22 and 23 operate in the same manner as previously described depending upon the condition of sensor 16 with respect to expelling air from chamber 24. It is to be noted that instead of the electrical contacts 33 and 34 which are communicated by plate 32 as shown in FIG. 3, the embodiment shown in FIG. 4 includes a passageway 47 provided in the plunger 27 which is moved into fluid conducting relationship or out of fluid conducting relationship with respect to an active supply line 48. The plunger 27 is returned to its original position by means of the return spring 36.

Referring now to FIGS. 5 and 6, another embodiment of the present invention is shown wherein the soil moisture switch assembly 13 is employed in connection with a conventional electric, automatic diaphragm valve 12 such as is available under the trade name of Aqua-Dial having part number 5136. In such a valve, the valve is opened by energizing a solenoid coil 50 under normal conditions. However, solenoid 50 is incorporated into the switch assembly 13 so as to function in a similar manner to the coil 25 described with respect to the embodiment previously illustrated in FIGS. 1-3. However, when the valve is opened, a plunger 51 raises as shown in FIG. 6 so that water under pressure is supplied from tube 20 into the body of valve 12 and exiting the valve through pipe 20'. As shown in FIG. 5, the plunger 51 closes off a main flowthrough port identified by numeral 52. In FIG. 6, port 52 is open and water flow is indicated in a general direction of the arrows. With respect to the principle of operation, the valve is opened by raising the diaphragm plunger 51. This is achieved by draining the area above the diaphragm which is indicated by numeral 53. Once the area above diaphragm 53 has been drained, pressure on the underside of the disc and diaphragm 53 opens the valve to full flow as shown in FIG. 6. The valve is held closed by water pressure from the main body flowing through the stem orifice into the valve cover chamber above the diaphragm 53. This pressure, when applied to the valve cover chamber, allows the frictionless diaphragm to close the valve smoothly and drip-tight against the flow of water. A stainless steel spring 54 holds the valve closed when the system pressure is off.

Furthermore, the remote control sprinkler valve is an electrically operated, diaphragm type globe valve which is normally closed. The valve body may be cast iron with a removable bronze seal ring and the diaphragm may be synthetic rubber reinforced with nylon cord and is fully supported. The valve is installed as a permanent fitting into sprinkler lines, above or under ground, in a horizontal, vertical or side position. Control wires 14 and 15 from the timer controlled 11 may be laid in the same trench with the water line.

In FIG. 5, it is noted that the switch assembly 13 includes a passageway 60 that intercommunicates with the chamber at the backside of diaphragm 53 and a chamber 61 provided in the housing of the switch assembly 13. Another passageway identified by numeral 62 which intercommunicates chamber 61 with an intermediate chamber 63. Chamber 63, in turn, is further intercommunicated with the outlet side of valve 12 via pipe 20' and chamber 64. It is also to be noted that one end of passageway 62 terminates in a port 65 and that intermediate passageway 66 terminates at chamber 63 with port 67. Port 65 is opened and closed by means of a plunger 68 while port 67 is opened and closed by means of a plunger 70. The opposing ends of the plunger are carried on diaphragm 71 and 72 respectively and the plungers are mounted for reciprocal movement with respect to the housing in response to movement of the diaphragms 71 and 72. The diaphragms are arranged in spaced-apart relationship so as to define a chamber 73 therebetween and this chamber is in communication with the air valve sensor 16 via pipes 18.

The principle of operation of the switch assembly is identical to that which has been previously described. In FIG. 5, diaphragm 71 and 72 move in unison in a similar fashion to the diaphragm shown in FIG. 2b. In this instance, the air valve 16 is wet due to the surrouding moisture in the soil 17 so that air in the chamber 73 cannot be purged or expelled. In actual operation, plunger 70 is moved when coil 50 is energized so as to open port 67 whereby fluid in passageway 52 may be discharged through intermediate passageway 66 into chamber 64. However, since diaphragm 71 moves in unison with diaphragm 72, plunger 68 closes port 65 so that water normally in chamber 61 cannot be introduced into chamber 62. The water in chamber 61 is derived via passageway 60 from behind the diaphragm valve 53 in the valve 12. In the illustration of FIG. 5, it can be seen that the water behind the diaphragm valve 53 will prevent the valve from opening port 52 since plunger 51 operates as a closure or seal. Therefore, even though the timer has activated the solenoid system, no pressurized water is supplied through port 52 to the outlet pipe 20'.

However, in FIG. 6, a situation is illustrated which is similar to that of FIG. 2c. In this instance, the solenoid 50 has been energized by the timer and port 67 is open to discharge the water in the passageway 62. Also, since the sensor 16 is dry due to the dryness of the surrounding soil 17, air is expelled from chamber 73 when plunger 70 moves toward diaphragm 71. However, since the air in chamber 73 has been expelled, there is no positive connection or communication between diaphragm 72 and diaphragm 71 so that diaphragm 71 remains in its non-flexed condition. In this condition, plunger 68 does not move so that port 65 is open to receive water from chamber 61. Therefore, a completed passageway is in existence for the water to flow from behind the diaphragm valve 53 through passageway 60, chamberd 61, passageway 62, chamber 63 and intermediate passageway 66 into chamber 64. Since the water pressure has now been relieved, the piston 51 will raise opening the port 52 to permit water to flow from pipe 20 into pipe 20'.

Therefore, in view of the foregoing, it can be seen that the novel moisture detection apparatus of the present invention provides an automatic means for activating a pressurized water valve so as to supply water to the soil only at a time when the soil is dry and plant life in need of moisture. The timer sets the hours that a sprinkler system, for example, is to be turned on while the sensor 16 determines the need for moisture based on moisture content of the soil. The detector or sensor 16 determines actual energization or actuation of the pressurized water control valve 12 in combination with the timer 11. Operating parameters in the form of inputs are supplied to the switch assembly 13 from the timer and the sensor. The timer energizes the coil of the switch while the sensor releases or maintains air in a sealed chamber between a pair of diaphragms. The release of the air permits energization and actuation of the water supply valve. As noted, the operation may be affected by electronic or hydraulic means. Positive pressure is employed to couple the opposite diaphragms of the switch so that the diaphragms will move in unison as shown in FIGS. 2b and 5. When the positive pressure is broken by dryness of the sensor 16, air is expelled from the chamber between the diaphragm and only one of the diaphragms moves as shown in FIG. 2c and FIG. 6.

The inventive concept including the switch may be employed in an application as a remote soil moisture indicator. In this embodiment the timer controller is replaced with a manual push-to-interrogate switch, which energizes the solenoid 25 and the water supply value is replaced with an indicator light that is "on" when the above button is pushed and the soil is drier than the transition point for the particular ceramic element pore diameter utilized. A further refinement of this application would be to replace the push button switch and indicator light with the appropriate interface devices to enable a computor to automatically interrogate the field moisture conditions and respond accordingly.

While particular embodiments of the present invention have been shown and described, it will be obvious to those skilled in the art that changes and modifications may be made without departing from this invention in its broader aspects and, therefore, the aim in the appended claims is to cover all such changes znd modifications as fall within the true spirit and scope of this invention.

What is claimed is:

1. A soil moisture detector and actuation apparatus for opening and closing a water supply valve, the combination comprising:
    a timer opening said water supply valve for a predetermined period of time;
    a soil moisture sensing means comprising a porous air valve buried in the soil adapted to block the passage of air when moist and to conduct the passage of air when dry;
    a detector having a pneumatic actuator means whereby a pressure level is maintained or released within a pressure chamber in response to the wet or dry soil condition sensed by said sensing valve; and
    release of said pressure level in said pressure chamber of said pneumatic actuator means operable in unison with said timer during said predetermined period of time to actuate said water supply valve.

2. The invention as defined in claim 1 wherein said pneumatic actuator means includes a housing having the opposing surfaces of a pair of spaced apart diaphragms defining said pressure chamber and a tube interconnecting said sensing air valve with said pressure chamber.

3. The invention as defined in claim 2 wherein a first of said diaphragms is incorporated into an electrical solenoid operated by said timer to move towards said other diaphragm;
    said other diaphragm movable in response to movement of said first diaphragm and the presence of said pressure level to prevent actuation of said water supply valve.

4. The invention as defined in claim 1 wherein said pneumatic actuator means includes means for varying said pressure chamber and said means operably to reduce said pressure chamber to expel air therefrom in simultaneous response to said time and said sensing air valve.

5. The invention as defined in claim 4 including electrical means connected between said timer and said pneumatic actuator for operating said chamber varying means; and
    switch means coupled between said timer and said water supply valve response to said varying means to connect and disconnect said timer with said water supply valve.

6. The invention as defined in claim 4 including port means interconnecting passageways between a fluid reservoir and a fluid discharge chamber;
    plunger means carried on said chamber varying means for selectively opening and closing said passageways in response to a pressure differential being maintained or released between said sensing valve and said pneumatic actuator in response to said wet or dry condition of said sensing valve.

7. Moisture detection apparatus comprising;
    a water supply valve;
    timer means;
    soil moisture sensing means;
    a switch means operably coupling said timer means and said sensing means to said water supply valve whereby actuation of said switch means is responsive to energization by said timer means and detection of dry soil by said sensing means; and
    said sensing means is an air valve buried in the soil adapted to block the passage of air when moist.

8. The invention as defined in claim 7 wherein said switch means comprises a pressure chamber defined between a pair of flexible diaphragms;
    said timer means operably coupled to a selected one of said diaphragms for activation thereof into said pressure chamber;
    means carried on said other diaphragm operable in response to activation of said first diaphragm and the presence of positive pressure in said chamber to actuate said water supply valve; and
    said sensing means coupled to said chamber for determining positive or negative pressure according to the moisture condition of the soil.

9. The invention as defined in claim 7 wherein said switch means includes a housing defining an air chamber in fluid communication with said sensing means and means responsive to the presence of negative pressure in said air chamber for actuating said water supply valve and responsive to the presence of positive pressure to de-activate said water supply valve.

10. The invention as defined in claim 9 wherein said switch means further includes a pair of spaced-apart diaphragms defining said air chamber and a plunger carried on each of said diaphragms projecting away from said air chamber;
    one of said plungers actuated to move its associated diaphragm towards said other diaphragm in response to said timer;
    said other plunger actuated to operate said water supply valve in response to the absence of air pressure in said air chamber.

11. The invention as defined in claim 10 wherein said plunger actuations are electrical characterized by said first mentioned plunger functioning as a slug of a solenoid and said second mentioned plunger functioning as an electrical contact breaker.

12. The invention as defined in clain 10 wherein said plunger actuations are hydraulic characterized by said first mentioned plunger being moved by the presence of a hydraulic pressure on one side; and its opposite side as well as said other plunger being spring biased to return to original positions.

13. Moisture detection apparatus comprising;
    a water supply valve;
    timer means;
    soil moisture sensing means;
    a switch means operably coupling said timer means and said sensing means to said water supply valve whereby actuation of said switch means is responsive to energization by said timer means and detection of dry soil by said sensing means; and said sensing means is composed of a non-organic, capillary type material having pores of predetermined diameter whereby said means acts as an air valve to restrict air movement from the soil through said porous material when the soil in contact therewith has reached a predetermined high moisture condition wherein the moisture within the soil has closed said pores and to permit the passage of air from the soil through said porous material when the soil has reached a predetermined low moisture condition.

* * * * *